(12) United States Patent
Kim et al.

(10) Patent No.: US 10,789,670 B2
(45) Date of Patent: Sep. 29, 2020

(54) IMAGE DISPLAY DEVICE AND METHOD OF OPERATING THE SAME

(71) Applicant: SAMSUNG ELECTRONICS CO., LTD., Suwon-si, Gyeonggi-do (KR)

(72) Inventors: Ho-seon Kim, Suwon-si (KR);
Bong-seok Lee, Suwon-si (KR);
Hyun-don Yoon, Pohang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 273 days.

(21) Appl. No.: 15/441,557

(22) Filed: Feb. 24, 2017

(65) Prior Publication Data

US 2017/0323422 A1    Nov. 9, 2017

(30) Foreign Application Priority Data

May 3, 2016    (KR) .................. 10-2016-0054690

(51) Int. Cl.
| | |
|---|---|
| H04N 7/00 | (2011.01) |
| G06T 3/00 | (2006.01) |
| H04N 5/232 | (2006.01) |
| H04N 5/262 | (2006.01) |
| G06T 3/40 | (2006.01) |
| H04N 9/64 | (2006.01) |

(52) U.S. Cl.
CPC ............. *G06T 3/0062* (2013.01); *G06T 3/40* (2013.01); *H04N 5/23238* (2013.01); *H04N 5/23293* (2013.01); *H04N 5/2628* (2013.01); *H04N 9/64* (2013.01); *H04N 9/646* (2013.01)

(58) Field of Classification Search
CPC ..... G06T 3/0062; G06T 3/40; H04N 5/23238; H04N 5/23293; H04N 5/2628; H04N 9/64; H04N 9/646

USPC ......................................... 348/36, 231.3; 1/1
See application file for complete search history.

(56) References Cited

U.S. PATENT DOCUMENTS

| | | | |
|---|---|---|---|
| 6,005,611 A | 12/1999 | Gullichsen et al. | |
| 7,064,783 B2* | 6/2006 | Colavin ................. | G06T 3/403 |
| | | | 348/231.3 |
| 9,277,122 B1* | 3/2016 | Imura ..................... | G06T 7/73 |
| 2003/0103063 A1 | 6/2003 | Mojaver et al. | |
| 2005/0265619 A1 | 12/2005 | Ozaki | |
| 2008/0118180 A1 | 5/2008 | Kamiya et al. | |
| 2011/0221865 A1 | 9/2011 | Hyndman | |
| 2012/0113214 A1* | 5/2012 | Li ........................... | G03B 37/06 |
| | | | 348/36 |

(Continued)

FOREIGN PATENT DOCUMENTS

KR    10-2016-003614    1/2016

OTHER PUBLICATIONS

Extended Search Report dated Sep. 5, 2017 in counterpart European Patent Application No. 17159005.2.

*Primary Examiner* — Jayanti K Patel
*Assistant Examiner* — Richard B Carter
(74) *Attorney, Agent, or Firm* — Nixon & Vanderhye P.C.

(57) ABSTRACT

An image display device that displays an image of 360 degrees includes a display; and a controller configured to generate an image of 360 degrees in a spherical shape by mapping an image of 360 degrees in a planar shape to a sphere, to perform image quality processing on the spherical-shaped 360 degree image, and to control the display to display the 360 degree image on which the image quality processing is performed.

13 Claims, 7 Drawing Sheets

(56) References Cited

U.S. PATENT DOCUMENTS

| | | | |
|---|---|---|---|
| 2015/0264259 A1* | 9/2015 | Raghoebardajal | G06T 3/0062 348/36 |
| 2016/0028997 A1* | 1/2016 | Kanai | H04N 5/2628 348/39 |
| 2016/0119537 A1* | 4/2016 | Rapoport | H04N 1/00183 348/36 |

* cited by examiner

IMAGE DISPLAY DEVICE AND METHOD OF OPERATING THE SAME

CROSS-REFERENCE TO RELATED APPLICATION

This application is based on and claims priority under 35 U.S.C. § 119 to Korean Patent Application No. 10-2016-0054690, filed on May 3, 2016, in the Korean Intellectual Property Office, the disclosure of which is incorporated by reference herein in its entirety.

BACKGROUND

1. Field

The present disclosure relates generally to an image display device and a method of operating the image display device, and for example, to an image display device capable of displaying a 360 degree image and a method of operating the image display device.

2. Description of the Related Art

An image display device is a device having a function of displaying an image that is viewable by a user. A user may view broadcasting through an image display device. An image display device displays, on a display, broadcasting selected by a user from among broadcast signals transmitted by a broadcasting station. The current worldwide trend is to switch from analog broadcasting to digital broadcasting.

Digital broadcasting means broadcasting that transmits digital images and audio signals. Compared to analog broadcasting, digital broadcasting is robust to external noise and thus has low data loss, is advantageous in terms of error correction, and provides high definition screens. Digital broadcasting enables bidirectional services, unlike analog broadcasting.

Recently, smart televisions (TVs) have been supplied to provide a variety of contents to a digital broadcasting function. Smart TVs do not passively operate according to selections by users but aim to analyze and provide what users want without manipulation by the users.

Meanwhile, the image display device performs image quality processing on a video while not performing image quality processing on graphics. Accordingly, there is a problem in that a graphically processed 360 degree image is displayed without image quality processing being performed thereon.

SUMMARY

An image display device that performs image quality processing on a 360 degree image and a method of operating the image display device are provided.

Additional aspects will be set forth in part in the description which follows and, in part, will be apparent from the description.

According to an aspect of an example embodiment, an image display device that displays an image of 360 degrees includes: a display; and a controller configured to generate an image of 360 degrees in a spherical shape by mapping an image of 360 degrees in a planar shape to a sphere, to perform image quality processing on the spherical-shaped 360 degree image, and to control the display to display the 360 degree image on which the image quality processing is performed.

According to an aspect of another example embodiment, a method of operating an image display device that displays an image of 360 degrees includes generating an image of 360 degrees in a spherical shape by mapping an image of 360 degrees in a planar shape to a sphere; performing image quality processing on the spherical-shaped 360 degree image; and displaying the image of 360 degrees on which the image quality processing is performed.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
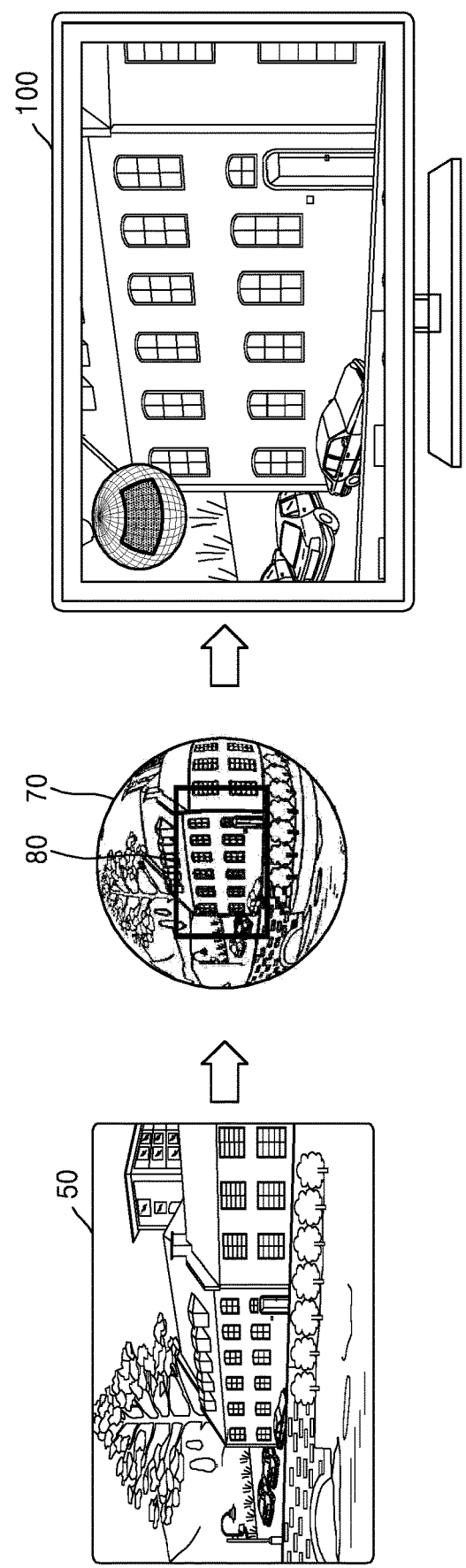
FIG. 1 is a diagram illustrating an example image display device that displays a 360 degree image, according to an example embodiment of the present disclosure.

Terms used in this disclosure will be described in brief, and then embodiments of the present disclosure will be described in detail.

As terms used in this disclosure, general terms currently in wide use are selected wherever possible in consideration of functions in the present disclosure, but may vary according to intentions of those of ordinary skill in the art, precedent cases, the advent of new technology, and so on. In particular, some terms may be arbitrarily selected, and in such cases, the detailed meanings of the terms will be stated in the corresponding description. Therefore, the terms used in this disclosure should be defined based on the meanings of the terms together with the description throughout the disclosure rather than their simple names.

Throughout the disclosure, when a portion "includes" an element, unless otherwise described, another element may be further included, rather than the presence of other elements being excluded. Also, terms such as "portion," "module," etc. used herein indicate a unit for processing at least one function or operation, in which the unit and the block may be embodied as hardware or software or may be embodied by a combination of hardware and software.

Reference will now be made in greater detail to embodiments, examples of which are illustrated in the accompanying drawings, wherein like reference numerals refer to like elements throughout. In this regard, the present embodiments may have different forms and should not be understood as being limited to the descriptions set forth herein. Accordingly, the embodiments are merely described below, by referring to the figures, to explain aspects. In the accompanying drawings, portions irrelevant to a description of the embodiments are omitted for clarity. Throughout the disclosure, like reference numerals refer to like elements. As used herein, the term "and/or" includes any and all combinations of one or more of the associated listed items. Expressions such as "at least one of," when preceding a list of elements, modify the entire list of elements and do not modify the individual elements of the list.

In the embodiments of the present disclosure, the term "user" may refer, for example, to a human being who controls a function or an operation of an image display device by using a control device and may include a viewer, a manager, or an installation engineer.

FIG. 1 is a diagram illustrating an example image display device 100 that displays a 360 degree image, according to an example embodiment of the present disclosure.

Referring to FIG. 1, the image display device 100 according to an embodiment may display the 360 degree image. The 360 degree image according to an embodiment may be an image having an angle of view of 360 degrees. For example, the 360 degree image may be an image generated based on a plurality of images captured in a direction of 360 degrees by using at least one camera. In this regard, the captured plurality of images may be mapped to a sphere, and contact points of the mapped images may be stitched, and thus the 360 degree image may be generated in a spherical shape. Also, the spherical-shaped 360 degree image may be converted into an image 50 of 360 degrees in a planar shape so as to be transmitted to or stored in another device as illustrated in FIG. 1.

The image display device 100 according to an embodiment may convert the 360 degree image 50 in the planar shape into an image 70 of 360 degrees in the spherical shape by performing graphics processing on the planar-shaped 360 degree image 50. For example, the image display device 100 may generate the 360 degree image 70 in the spherical shape by mapping the planar-shaped 360 degree image 50 to a sphere.

The image display device 100 may select a region 80 from the spherical-shaped 360 degree image 70 and display an image corresponding to the selected region 80 on a display. In this regard, the image display device 100 may perform image quality processing on the image corresponding to the selected region 80 and display the image quality processed image on the display. Also, the image display device 100 may scale the image according to a resolution of the display and display the scaled image on the display.

The image display device 100 according to an embodiment may be a television (TV) but this is merely an embodiment and may be implemented as an electronic device including a display. For example, the image display device 100 may be implemented as one of various electronic devices such as a smart phone, a tablet personal computer (PC), a digital camera, a camcorder, a laptop computer, a desktop computer, an e-book terminal, a digital broadcasting terminal, a personal digital assistant (PDA), a portable multimedia player (PMP), a navigation device, an MP3 player, a wearable device, or the like. In particular, embodiments may be easily implemented in a display device having a large display such as a TV but are not limited thereto. Also, the image display device 100 may be a fixed or mobile type and may be a digital broadcasting receiver capable of receiving digital broadcasting.

The image display device 100 may be implemented not only as a flat display device but also as a curved display device which is a screen having a curvature or a flexible display device having an adjustable curvature. An output resolution of the image display device 100 may include, for example, a high definition (HD) resolution, a full HD resolution, an ultra HD resolution, or a resolution higher than the ultra HD resolution.

The image display device may be controlled by a control device (not shown). The control device may be implemented as a device of various types for controlling the image display device 100, such as a remote controller or a cellular phone.

The control device may also control the image display device 100 based on short-range communication such as infrared (IR) or Bluetooth. The control device may control a function of the image display device 100 by using at least one of provided keys (including buttons), a touchpad, a microphone (not shown) capable of receiving the voice of a user, and a sensor (not shown) capable of recognizing a motion of the control device.

Figure 2:
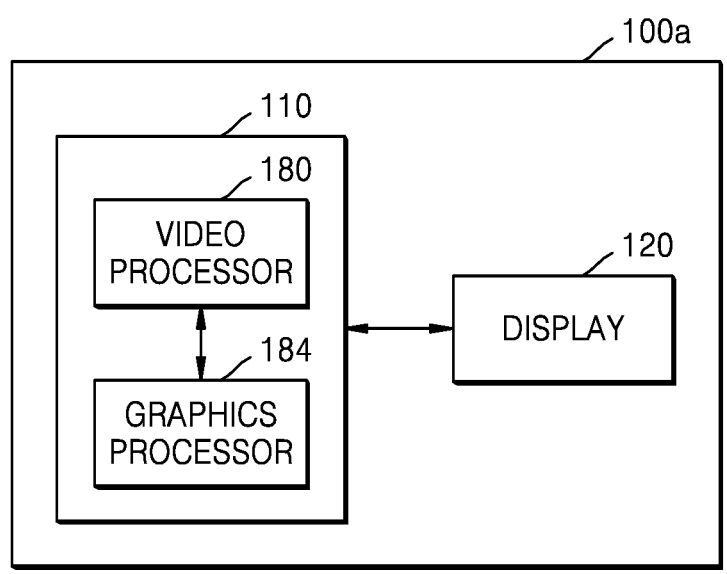
FIG. 2 is a block diagram illustrating an example configuration of an image display device according to an example embodiment of the present disclosure.

FIG. 2 is a block diagram illustrating an example configuration of an image display device 100a according to an example embodiment of the present disclosure. The image display device 100a of FIG. 2 may be an embodiment of the image display device 100 of FIG. 1.

Referring to FIG. 2, the image display device 100a according to an embodiment may include a controller (e.g., including processing circuitry) 110 and a display 120.

The controller 110 according to an embodiment may include various processing circuitry and/or program elements, and process an image signal and input the processed image signal to the display 120. Accordingly, an image corresponding to the image signal may be displayed on the display 120. The controller 110 may also control the image display device 100a according to a user instruction or an internal program. The controller 110 may also include a video processor 180 and a graphics processor 184.

The video processor 180 may process video data received by the image display device 100a. The video processor 180 may include various processing circuitry and/or program elements, such as, for example, and without limitation, a video decoder that performs decoding on the video data. The video processor 180 may also perform various image processing operations, such as scaling, noise filtering, frame rate conversion, and resolution conversion, on the video data. The video decoder 180 according to an embodiment may perform decoding on a planar-shaped 360 degree image. The planar-shaped 360 degree image according to an embodiment may be expressed as a YUV color space.

The graphics processor 184 may include various graphics processing circuitry and use a calculator (not shown) and a renderer (not shown) to generate a screen including various objects such as an icon, image, text, or the like. The calculator may use a user input sensed through a sensor to calculate attribute values, such as coordinates, forms, sizes, and colors with which respective objects are to be displayed according to a layout of the screen. The renderer may generate a screen of various layouts including the objects on the basis of the attribute values calculated by the calculator. The screen generated by the renderer may be displayed within a display region of the display 120.

The graphics processor 184 according to an embodiment may convert the decoded planar-shaped 360 degree image into a 360 degree image in a spherical shape by performing graphics processing on the planar-shaped 360 degree image.

For example, the graphics processor 184 may generate the spherical-shaped 360 degree image by mapping the planar-shaped 360 degree image to a sphere. The spherical-shaped 360 degree image according to an embodiment may be expressed as an RGB color space.

The controller 110 according to an embodiment may convert a color space of the spherical-shaped 360 degree image into the YUV color space from the RGB color space. For example, the controller 110 may convert the color space into the YUV color space from the RGB color space with respect to a region of the spherical-shaped 360 degree image. In this regard, the controller 110 may convert the RGB color space into the YUV color space by using a conversion equation.

The video processor 180 according to an embodiment may further include an image quality processor (not shown) that may include various processing circuitry and/or program elements that perform image quality processing on a video image or the spherical-shaped 360 degree image having the converted color space. For example, the video processor 180 may enhance a definition of an image by definitely processing an edge included in the image. The video processor 180 may also perform a processing operation of reducing jagged edges appearing in the image. Jagged edges is a phenomenon, appearing in a rasterizing method of indicating lines as points, in which outlines of objects such as diagonal lines, circles, curves, etc. are not smooth but are jagged in a stair shape. The video processor 180 may reduce jagged edges by adjusting a resolution of the image. Alternatively, the video processor 180 may reduce jagged edges by adjusting a brightness of a boundary surface, creating an intermediate color, and performing anti-aliasing that makes the image look soft.

Also, the video processor 180 may optimize a stereoscopic effect and a color sense of the image by improving a contrast ratio and a color of the image. As the contrast ratio of the image gets higher, the image may be expressed in a clearer and more exact color.

Also, the video processor 180 may control a frame rate in order to reduce juddering. Juddering may refer, for example, to a phenomenon in which a screen blurs as if a juddering movement appears around a moving object.

The display 120 may generate a driving signal by converting an image signal, a data signal, an on-screen display (OSD) signal, a control signal, etc. processed by the controller 110. The display 120 may be implemented as a plasma display panel (PDP), a liquid crystal display (LCD), an organic light emitting diode (OLED) display, a flexible display, or the like, but is not limited thereto, and may also be implemented as a three-dimensional (3D) display. The display 120 may also be configured as a touch screen and thus used as an input device as well as an output device.

The display 120 according to an embodiment may display an image corresponding to a region of a 360 degree image. The image displayed on the display 120 may be an image quality processed 360 degree image.

Figure 3:
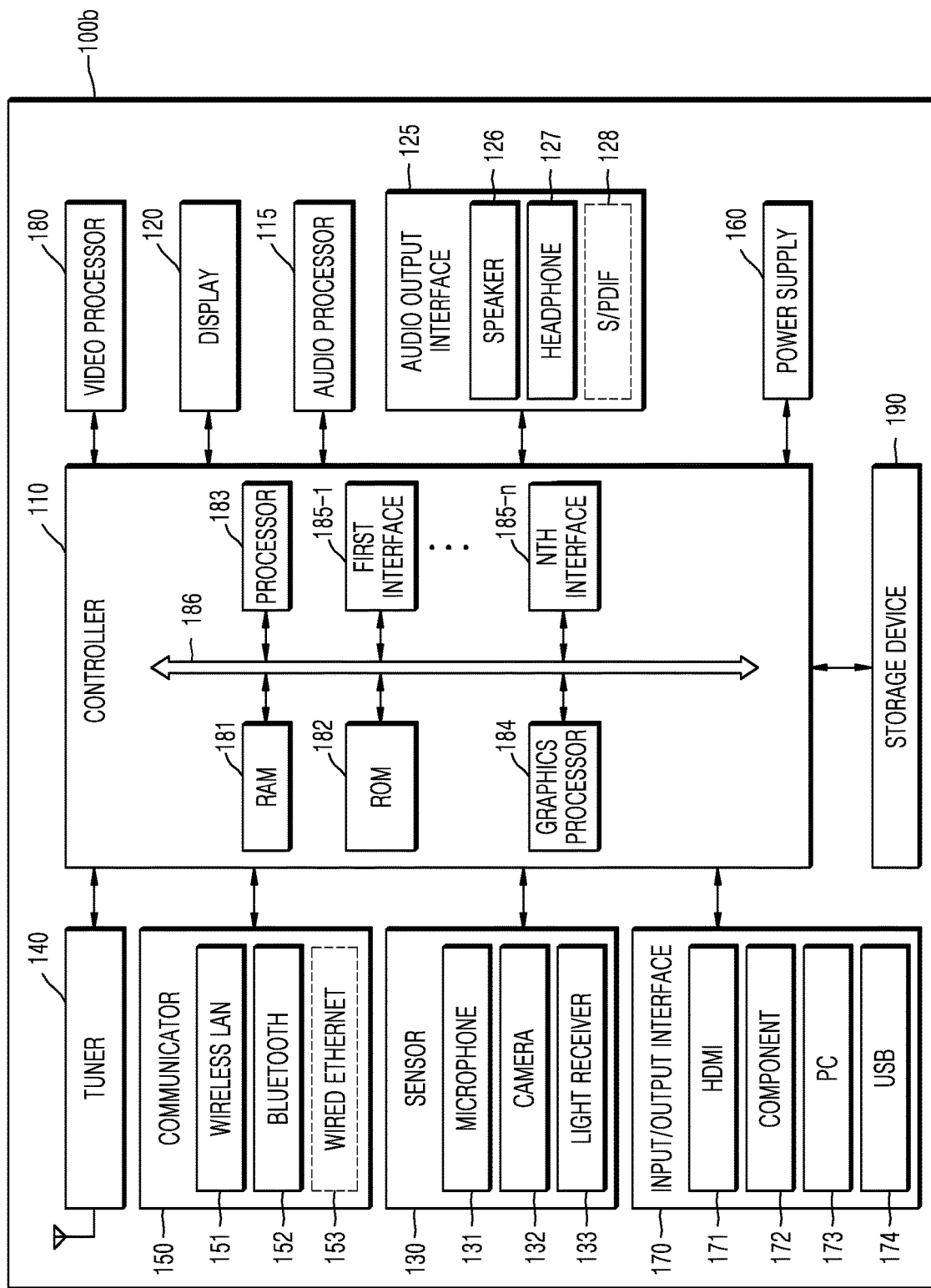
FIG. 3 is a block diagram illustrating an example configuration of an image display device according to an example embodiment of the present disclosure.

FIG. 3 is a block diagram illustrating an example configuration of an image display device 100b according to an example embodiment of the present disclosure. The image display device 100b of FIG. 3 may be an embodiment of the image display device 100 of FIG. 1.

Referring to FIG. 3, the image display device 100b according to an embodiment may further include a video processor 180, an audio processor 115, an audio output interface (e.g., including audio output circuitry) 125, a power supply 160, a tuner 140, a communicator (e.g., including communication circuitry) 150, an input/output interface (e.g., including input/output interface circuitry) 170, and a storage device 190, in addition to the controller 110, the display 120, and the sensor 130.

Regarding the controller 110, the display 120, and the sensor 130 of FIG. 3, the same descriptions as provided with reference to FIG. 2 will not be repeated. Also, the video processor 180 is described as a configuration included in the controller 110 in FIG. 2 but is not limited thereto. As illustrated in FIG. 3, the video processor 180 may be implemented as a configuration separate from the controller 110.

The display 120 may display a video included in a broadcast signal received by the tuner 140 under control of the controller 110. The display 120 may display content (e.g., a video) that is input through the communicator 150 or the input/output interface 170. The display 120 may output an image stored in the storage device 190 under control of the controller 110. The display 120 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 115 may include various circuitry and/or program elements that process audio data. The audio processor 115 may perform various processing operations, such as decoding, amplification, and noise filtering, on the audio data. The audio processor 115 may include a plurality of audio processing modules to process audio corresponding to a plurality of pieces of content.

The audio output interface 125 may include various circuitry that output audio included in a broadcast signal received by the tuner 140 under control of the controller 110. The audio output interface 125 may output audio (e.g., a voice or sound) that is input through the communicator 150 or the input/output interface 170. The audio output interface 125 may output audio stored in the storage device 190 under control of the controller 110. The audio output interface 125 may include at least one of a speaker 126, a headphone output terminal 127, and a Sony/Philips digital interface (S/PDIF) output terminal 128. The audio output interface 125 may include a combination of the speaker 126, the headphone output terminal 127, and the S/PDIF output terminal 128.

The power supply 160 may supply power that is input from an external power source to internal elements of the image display device 100b under control of the controller 110. The power supply 160 may supply power that is output from one or more batteries (not shown) positioned inside the image display device 100b under control of the controller 110 to the internal elements.

The tuner 140 may tune and select only frequency of a channel to be received by the image display device 100 from among many frequency components by amplifying, mixing, and resonating a broadcasting signal received by wired or wirelessly. The broadcast signal may include audio, video, and additional information (e.g., an electronic program guide (EPG)).

The tuner 140 may receive a broadcast signal in a frequency band corresponding to a channel number (e.g., cable broadcasting No. 506) in accordance with a user input (e.g., a control signal received from the control device 200, for example, a channel number input, a channel up/down input, and a channel input on an EPG screen).

The tuner 140 may receive the broadcast signal from various sources, such as terrestrial broadcasting, cable broadcasting, satellite broadcasting, and Internet broadcasting. The tuner 140 may also receive a broadcast signal from a source such as analog broadcasting or digital broadcasting. The broadcast signal received by the tuner 140 may be decoded (e.g., audio decoding, video decoding, or additional information decoding) and separated into audio, video, and/or additional information. The separated audio, video, and/or additional information may be stored in the storage device 190 under control of the controller 110.

The image display device 100b may include one tuner 140 or a plurality of tuners 140. The tuner 140 may be implemented as all-in-one with the image display device 100b or may implemented as a separate device (e.g., a set-top box; not shown) having a tuner electrically connected to the image display device 100b, or as a tuner (not shown) connected to the input/output interface 170.

The communicator 150 may include various communication circuitry and connect the image display device 100b with an external device (e.g., an audio device) under control of the controller 110. The controller 110 may transmit/receive content to/from the connected external device through the communicator 150, download an application from the external device, or perform web browsing. The communicator 150 may include various communication circuitry, such as, for example, and without limitation, one of a wireless LAN (WLAN) 151, Bluetooth 152, and wired Ethernet 153 in accordance with the performance and structure of the display device 100. The communicator 150 may include a combination of WLAN 151, Bluetooth 152, and wired Ethernet 153. The communicator 150 may receive a control signal of the control device 200 under control of the controller 110. The control signal may be implemented as a Bluetooth type signal, an RF type signal, or a WiFi type signal.

The communicator 150 may further include short-range communication (e.g., near field communication (NFC) (not shown) and Bluetooth low energy (BLE) (not shown)) in addition to Bluetooth 152.

The sensor 130 may sense a voice, an image, or an interaction of a user and may include a microphone 131, a camera 132, and a light receiver 133.

The microphone 131 may receive a voice of a user. The microphone 131 may convert the received voice into an electrical signal and output the electrical signal to the controller 110. The voice of the user may include, for example, a voice corresponding to a menu or function of the image display device 100b.

The camera 132 may receive an image (e.g., consecutive frames) corresponding to a motion of the user including a gesture within a camera recognition range. The controller 110 may use a received motion recognition result to select a menu displayed on the image display device 100b or perform control corresponding to the motion recognition result. For example, the control may include channel adjustment, volume adjustment, indicator movement, and cursor movement.

The light receiver 133 may receive an optical signal (including a control signal) from the external control device 200 through an optical window (not shown) of a bezel of the display 120. The light receiver 133 may receive an optical signal corresponding to a user input (e.g., a touch, a press, a touch gesture, a voice, or a motion) from the control device 200. The control signal may be extracted from the received optical signal under control of the controller 110.

The input/output interface 170 may include various input/output circuitry and receive a video (e.g., a moving picture), audio (e.g., a voice or music, etc.), and additional information (e.g., an EPG, etc.) from the outside of the image display device 100b under control of the controller 110. The input/output interface 170 may include various interface circuitry, such as, for example, and without limitation, one of a high-definition multimedia interface (HDMI) port 171, a component jack 172, a PC port 173, and a USB port 174. The input/output interface 170 may include a combination of the HDMI port 171, the component jack 172, the PC port 173, and the USB port 174.

The controller 110 may include various processing circuitry and control an overall operation of the image display device 100b and signal flow between the internal elements of the image display device 100b and to process data. When there is an input or a present and stored condition is satisfied, the controller 110 may execute an operating system (OS) and various applications that are stored in the storage device 190.

The controller 110 may include random access memory (RAM) 181 that stores a signal or data received from the outside of the image display device 100b or is used as a storage region corresponding to various tasks performed by the image display device 100b, read only memory (ROM) 182 that stores a control program for controlling the image display device 100b, and a processor 183.

The processor 183 may include a graphics processing unit (GPU) 184 for performing graphics processing corresponding to a video. The processor 183 may be implemented as a system-on-chip (SoC) in which a core (not shown) and the GPU 184 are integrated. The processor 183 may include a single core, a dual core, a triple core, a quad core, or multiple cores.

The processor 183 may include a plurality of processors. For example, the processor 183 may be implemented as a main processor (not shown) and a sub processor (not shown) that operates in a sleep mode.

First to nth interfaces 185-1 to 185-n may be connected with the above-described various elements. One of the first to nth interfaces 185-1 to 185-n may be a network interface connected with an external device through a network.

The RAM 181, the ROM 182, the processor 183, the graphics processor 184, and the first to nth interfaces 185-1 to 185-n may be connected to each other through an internal bus 186.

The term "a controller of an image display device" in the present embodiment includes the processor 183, the ROM 182, and the RAM 181.

The storage device 190 may store various types of data, programs, or applications for driving and controlling the image display device 100b under control of the controller 110. The storage device 190 may store input/output signals or data corresponding to the driving of the video processor 180, the display 120, the audio processor 115, the audio output interface 125, the power supply 160, the tuner 140, the communicator 150, the sensor 130, and the input/output interface 170. The storage device 190 may store control programs for controlling the image display device 100b and the controller 110, an application initially provided by a manufacturer or downloaded from the outside, a graphical user interface (GUI) associated with the application, an object (e.g., an image text, an icon, a button, etc.) for providing the GUI, user information, documents, databases, or relevant data.

In an embodiment, the term "storage" includes the storage device 190, the ROM 182, or RAM 181 of the controller 110, or a memory card (e.g., a micro SD card or USB memory) (not shown) mounted in the image display device 100*b*. The storage device 190 may include a nonvolatile memory, a volatile memory, a hard disk drive (HDD), and a solid state drive (SSD).

The image display device 100*b* having the display 120 may be electrically connected with a separate external device (e.g., a set-top box) (not shown) having a tuner. For example, it will be easily understood by one of ordinary skilled in the art that the image display device 100*b* may be implemented as an analog TV, a digital TV, a 3D TV, a smart TV, an LED TV, an OLED TV, a plasma TV, or a monitor, but is not limited thereto.

The block diagrams of the image display devices 100*a* and 100*b* illustrated in FIGS. 2 and 3 are block diagrams of an example embodiment. The elements illustrated in the block diagrams may be integrated with each other, some of the elements may be omitted, or other elements may be added according to a specification of the image display device 100. In other words, as occasion demands, two or more elements may be integrated as a single element or a single element may be divided into two or more elements. Functions performed by respective blocks are merely for describing embodiments, and their specific operations and devices do not limit the scope of the present disclosure.

Figure 4:
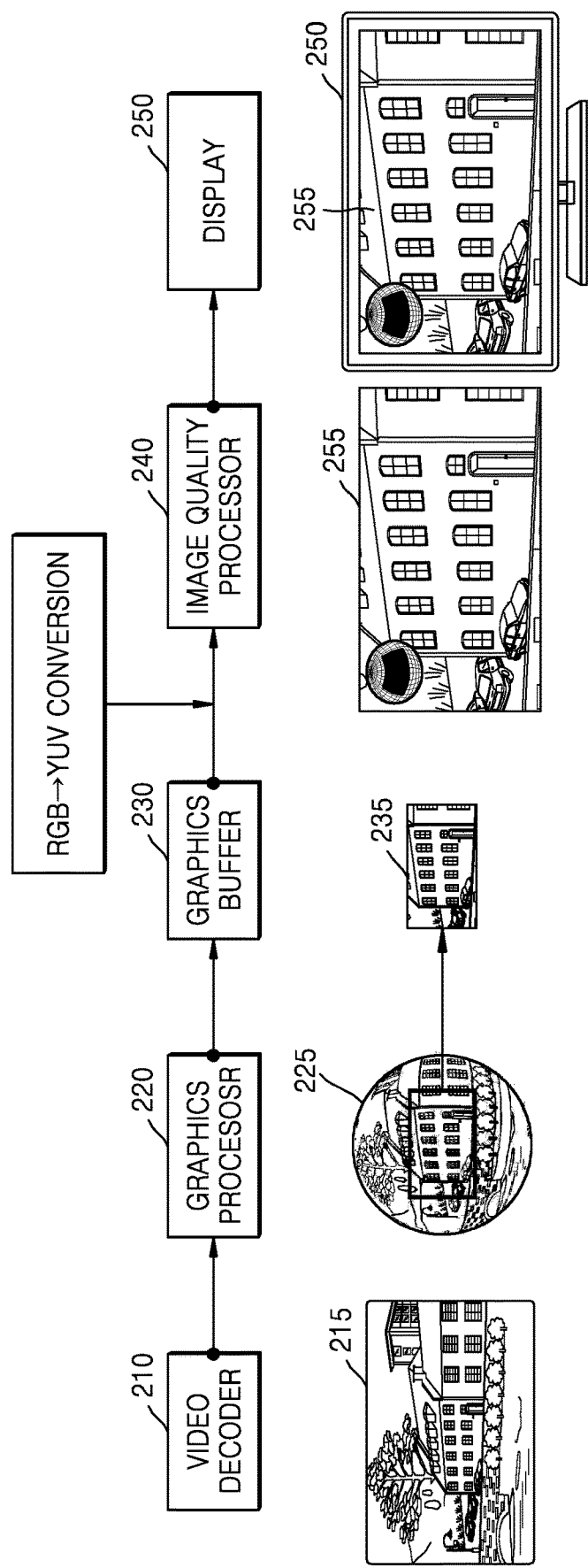
FIG. 4 is a diagram illustrating an example method in which an image display device processes and displays a 360 degree image, according to an example embodiment of the present disclosure.

FIG. 4 is a diagram illustrating an example method in which the image display device 100 processes and displays a 360 degree image according to an example embodiment of the present disclosure.

Referring to FIG. 4, a video decoder 210 may perform decoding on a 360 degree image 215. In this regard, the 360 degree image 215 may be a planar-shaped 360 degree image that is received from an external device or is stored in the image display device 100. Also, the 360 degree image 215 may be expressed as a YUV color space.

A graphics processor 220 may generate an image 225 of 360 degrees in a spherical shape by mapping the planar-shaped 360 degree image 215 to a sphere. In this regard, the spherical-shaped 360 degree image 225 may be expressed as an RGB color space.

The image display device 100 may extract a region 235 from the spherical-shaped 360 degree image 225 and may store the region 235 in a graphics buffer 230. In this regard, the extracted region 235 may be a preset region or a region selected according to a user input. An image corresponding to the region 235 stored in the graphics buffer 230 may be an image of an original size that is not scaled.

The image display device 100 may convert a color space of the image corresponding to the region 235 stored in the graphics buffer 230 into a YUV color space from an RGB color space.

The image display device 100 may control the image converted into the YUV color space to be input to an image quality processor 240. In this regard, the image display device 100 may control a frame rate input to the image quality processor 240. For example, the image display device 100 may control the frame rate input to the image quality processor 240 to be 30 frame/sec but is not limited thereto.

The image quality processor 240 may perform image quality processing on the input image. For example, the image quality processor 240 may enhance a definition of the input image by definitely processing an edge included in the input image. Also, the image quality processor 240 may reduce jagged edges appearing in the image by adjusting a resolution of the image or performing anti-aliasing. Also, the image quality processor 240 may optimize and/or improve a stereoscopic effect and a color sense of the image by improving a contrast ratio and a color of the image. Also, the image quality processor 240 may reduce juddering by controlling the frame rate.

Also, the image quality processor 240 may adjust a scale of the input image or the image quality processed image. For example, the image quality processor 240 may adjust a scale of the image according to a resolution of a display 250. Alternatively, the image quality processor 240 may adjust a scale based on a zooming level adjustment input of the image.

The display 250 according to an embodiment may display a 360 degree image 255 on which image quality processing is performed.

Figure 5:
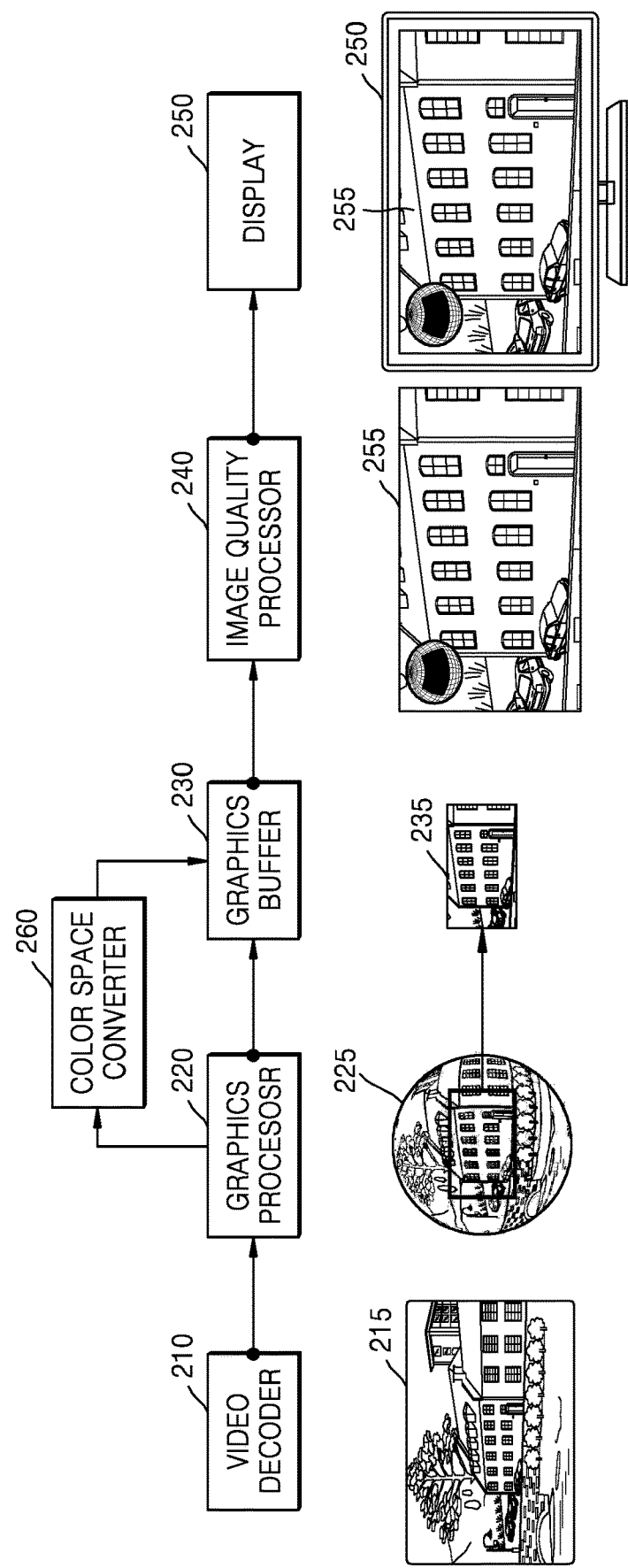
FIG. 5 is a diagram illustrating an example method in which an image display device processes and displays a 360 degree image, according to an example embodiment of the present disclosure.

FIG. 5 is a diagram illustrating an example method in which the image display device 100 processes and displays the 360 degree image 215, according to an example embodiment of the present disclosure.

Referring to FIG. 5, the video decoder 210 may perform decoding on the image 215 of 360 degrees. The graphics processor 220 may generate the 360 degree image 225 in a spherical shape by mapping the planar-shaped 360 degree image 215. This is described in detail with reference to FIG. 4 above, and thus a redundant description thereof will not be repeated here.

The image display device 100 according to an embodiment may include a color space converter 260. The color space converter 260 may include various color space converter circuitry and/or program elements that convert a color space of the region 235 of the spherical-shaped 360 degree image 225 into a YUV color space from an RGB color space.

A graphics buffer 230 may store an image corresponding to the region converted into the YUV color space.

The image display device 100 may control the image converted into the YUV color space to be input to the image quality processor 240. The image quality processor 240 may perform image quality processing on the input image. This is described in detail with reference to FIG. 4 above, and thus a redundant description thereof will not be repeated here.

Also, the image quality processor 240 may adjust a scale of the input image or the image quality processed image. The display 250 may display the 360 degree image 255 on which image quality processing is performed.

Figure 6:
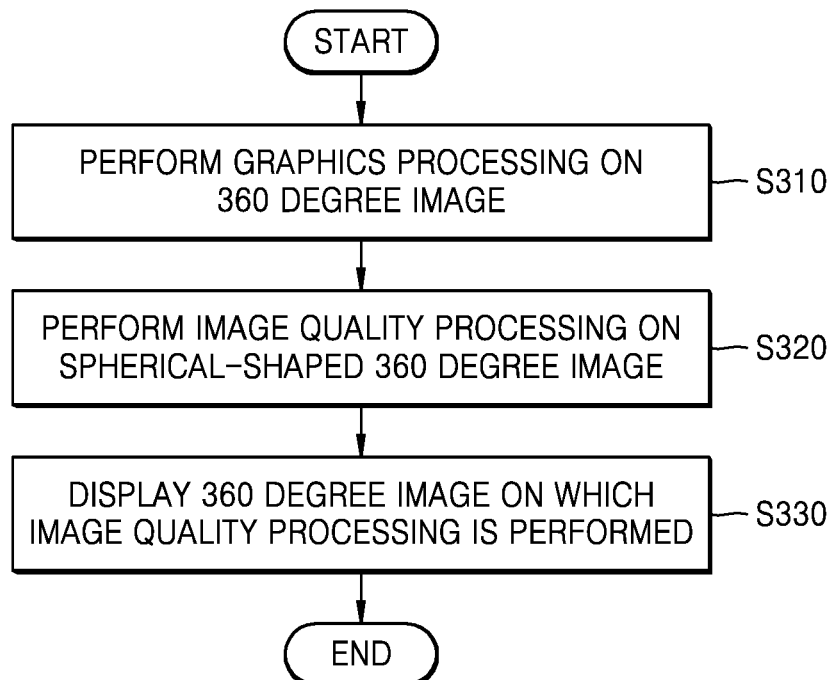
FIG. 6 is a flowchart illustrating an example method of operating an image display device, according to an example embodiment.
Figure 7:
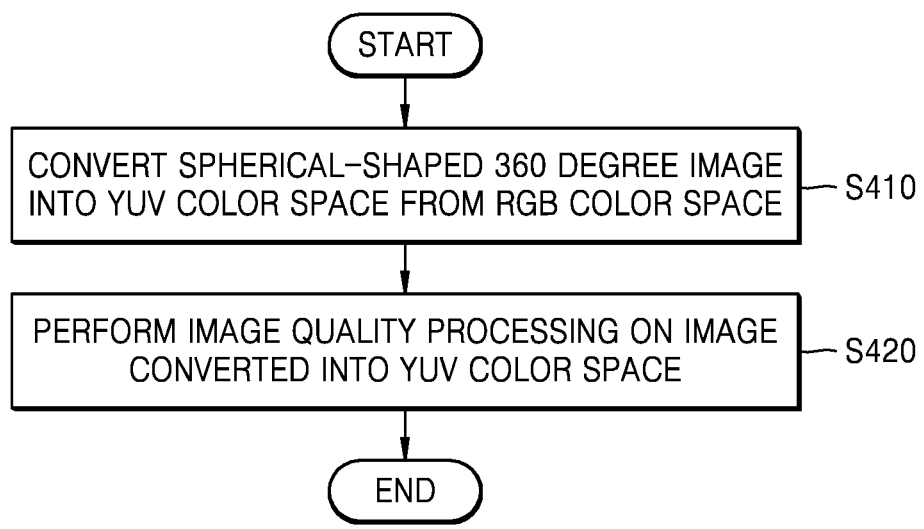
FIG. 7 is a flowchart illustrating example operation S320 of FIG. 6 of performing image quality processing on a 360 degree image generated in a spherical shape.

FIG. 6 is a flowchart illustrating an example method of operating the image display device 100 according to an example embodiment of the present disclosure. FIG. 7 is a flowchart illustrating example operation S320 of FIG. 6.

Referring to FIG. 6, the image display device 100 may perform graphics processing on a 360 degree image (operation S310). For example, the image display device 100 may generate a 360 degree image in a spherical shape by mapping a planar-shaped 360 degree image to a sphere. In this regard, the generated spherical-shaped 360 degree image may be expressed as an RGB color space.

The image display device 100 may perform image quality processing on the spherical-shaped 360 degree image (operation S320).

Referring to FIG. 7, the image display device 100 may convert the spherical-shaped 360 degree image into a YUV color space from the RGB color space (operation S410). For example, the image display device 100 may convert a color space of a region of the spherical-shaped 360 degree image into the YUV color space from the RGB color space. In this regard, the image display device 100 may convert the RGB color space into the YUV color space by using a conversion equation.

The image display device 100 may perform image quality processing on the image converted into the YUV color space (operation S420).

For example, the image display device 100 may enhance a definition of the image by definitely processing an edge included in the image. Also, the image display device 100 may reduce jagged edges appearing in the image by adjusting a resolution of the image or performing anti-aliasing. Also, the image display device 100 may optimize a stereoscopic effect and a color sense of the image by improving a contrast ratio and a color of the image. Also, the image display device 100 may reduce juddering by controlling the frame rate.

Also, the image display device 100 may adjust a scale of the image quality processed image. For example, the image display device 100 may adjust a scale of the image according to a resolution of a display. Alternatively, the image display device 100 may adjust a scale based on a zooming level adjustment input of the image.

Referring to FIG. 6, the image display device 100 may display the 360 degree image on which image quality processing is performed (operation S330).

According to an embodiment, image quality processing may be performed on a graphically processed 360 degree image by converting a color space of the graphically processed 360 degree image, thereby providing a 360 degree image with an improved image quality.

A method of operating an image display device according to an embodiment may be implemented as program instructions executable by a variety of computers and recorded on a computer readable medium. The computer-readable medium may also include a program instruction, a data file, a data structure, or combinations thereof. The program instructions recorded on the media may be designed and configured specially for the embodiments or be known and available to those skilled in computer software. Examples of the computer-readable medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, ROM, RAM, flash memory, etc. Examples of the program instructions include machine codes made by, for example, a compiler, as well as high-level language codes executable by a computer, using an interpreter.

It should be understood that the various example embodiments described herein should be considered in a descriptive sense only and not for purposes of limitation. Descriptions of features or aspects within each example embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims.

What is claimed is:

1. An image display device configured to display an image of 360 degrees, the image display device comprising:
   a display; and
   a controller configured to:
      generate an image of 360 degrees in a spherical shape by mapping an image of 360 degrees in a planar shape to a sphere, the spherical-shaped 360 degree image being represented in a first color space,
      extract a portion from the spherical-shaped 360 degree image and store the extracted portion of the spherical-shaped 360 degree image in a graphics buffer, the extracted portion of the spherical-shaped 360 degree image being represented in the first color space,
      convert a color space of only the extracted portion of the spherical-shaped 360 degree image from the first color space to a second color space to perform image quality processing,
      perform image quality processing on only the extracted portion of the spherical-shaped 360 degree image in the second color space, and
      control the display to display the extracted portion of the spherical-shaped 360 degree image on which the image quality processing has been performed.

2. The image display device of claim 1, wherein the planar-shaped 360 degree image is expressed as a YUV color space, and the spherical-shaped 360 degree image is expressed as an RGB color space, and
   wherein the controller is further configured to convert a color space of the extracted portion of the spherical-shaped 360 degree image into the YUV color space from the RGB color space and to perform image quality processing on the extracted portion of the spherical-shaped 360 degree image converted into the YUV color space.

3. The image display device of claim 2, wherein the controller is further configured to perform image quality processing on an image corresponding to the extracted portion, wherein the image quality processing comprises at least one of: an enhancement of a definition, a reduction of jagged edges, an enhancement of a contrast ratio, an improvement of a color, and reducing juddering.

4. The image display device of claim 2, wherein the controller is further configured to adjust a scale of an image corresponding to the extracted portion converted into the YUV color space.

5. The image display device of claim 1, wherein the controller comprises:
   a graphics processor configured to generate the spherical-shaped 360 degree image by mapping the planar-shaped 360 degree image to the sphere; and
   a video processor configured to perform image quality processing on the extracted portion of the spherical-shaped 360 degree image,
   wherein the video processor is further configured to adjust a scale of the 360 degree image displayed on the display.

6. The image display device of claim 1, wherein the controller is further configured to control a frame rate used to input the extracted portion of the spherical-shaped 360 degree image stored in the graphics buffer to an image quality processor configured to perform image quality processing.

7. The image display device of claim 1, wherein the planar-shaped 360 degree image is expressed as a YUV color space, and the spherical-shaped 360 degree image is expressed as an RGB color space, and
   wherein the image display device further comprises:
   a color space converter comprising color space conversion circuitry configured to convert the color space of the extracted portion of the spherical-shaped 360 degree image into the YUV color space from the RGB color space.

8. A method of operating an image display device configured to display an image of 360 degrees, the method comprising:

generating an image of 360 degrees in a spherical shape by mapping an image of 360 degrees in a planar shape to a sphere, the planer-shaped 360 degree image being in a first color space;

extracting a portion from the spherical-shaped 360 degree image and store the extracted portion of the spherical-shaped 360 degree image in a graphics buffer, the extracted portion of the spherical-shaped 360 degree image being represented in the first color space;

converting a color space of only the extracted portion of the spherical-shaped 360 degree image from the first color space to a second color space to perform image quality processing;

performing image quality processing on only the extracted portion of the spherical-shaped 360 degree image in the second color space; and displaying the extracted portion of the spherical-shaped 360 degrees image on which the image quality processing has been performed.

9. The method of claim 8, wherein the planar-shaped 360 degree image is expressed as a YUV color space, and the spherical-shaped 360 degree image is expressed as an RGB color space, and wherein the method further comprises: converting a color space of the extracted portion of the spherical-shaped 360 degree image into the YUV color space from the RGB color space, wherein the performing of the image quality processing comprises: performing the image quality processing on the extracted portion of the spherical-shaped 360 degree image converted into the YUV color space.

10. The method of claim 9, wherein the performing of the image quality processing comprises: performing image quality processing on an image corresponding to the extracted portion, wherein image quality processing comprises at least one of: an enhancement of a definition, a reduction of jagged edges, an enhancement of a contrast ratio, an improvement of a color, and reducing juddering.

11. The method of claim 9, further comprising: adjusting a scale of an image corresponding to the extracted portion converted into the YUV color space.

12. The method of claim 8, further comprising: controlling a frame rate used to input the extracted portion of the spherical-shaped 360 degree image stored in the graphics buffer to an image quality processor configured to perform image quality processing.

13. A non-transitory computer readable recording medium storing a program for executing the method of claim 8 on a computer.

* * * * *